US012792815B2

(12) United States Patent
Lin et al.

(10) Patent No.: US 12,792,815 B2
(45) Date of Patent: Nov. 10, 2026

(54) METHOD AND NON-TRANSITORY COMPUTER-READABLE MEDIUM FOR GENERATING A LAYOUT OF A SEMICONDUCTOR DEVICE

(71) Applicant: TAIWAN SEMICONDUCTOR MANUFACTURING COMPANY LTD., Hsinchu (TW)

(72) Inventors: Yen-Hung Lin, Hsinchu City (TW); Jiann-Tyng Tzeng, Hsinghu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 949 days.

(21) Appl. No.: 18/152,167

(22) Filed: Jan. 10, 2023

(65) Prior Publication Data

US 2024/0104286 A1 Mar. 28, 2024

Related U.S. Application Data

(60) Provisional application No. 63/375,698, filed on Sep. 15, 2022.

(51) Int. Cl.

| | |
|---|---|
| ***G06F 30/398*** | (2020.01) |
| ***G06F 30/3953*** | (2020.01) |
| *G06F 119/12* | (2020.01) |

(52) U.S. Cl.
CPC ........ *G06F 30/3953* (2020.01); *G06F 30/398* (2020.01); *G06F 2119/12* (2020.01)

(58) Field of Classification Search
CPC ...... G06F 30/398; G06F 30/39; G06F 30/394; G06F 2119/18; G06F 30/392; G06F 2119/12; G06F 30/3953; G06F 30/3947; G06F 30/337; G06F 30/38; G06F 30/327; G06F 2115/06; G06F 2117/12; G06F 30/36; H10B 41/20; H10B 43/20; H10B 63/30; H10B 63/80; H10B 63/845; H10B 63/34; H10D 84/985; H10D 89/10; H10D 84/974; H10D 84/0172; H10D 86/01; H10D 86/201
USPC .................................................. 716/108–115
See application file for complete search history.

(56) References Cited

U.S. PATENT DOCUMENTS

| | | | | |
|---|---|---|---|---|
| 2020/0134128 | A1 * | 4/2020 | Peng | G06F 30/392 |
| 2021/0272605 | A1 * | 9/2021 | Peng | G11C 5/025 |
| 2022/0084945 | A1 * | 3/2022 | Tien | H10W 20/0698 |

* cited by examiner

*Primary Examiner* — Binh C Tat
(74) *Attorney, Agent, or Firm* — WPAT LAW; Anthony King

(57) ABSTRACT

The present disclosure provides a method and a non-transitory computer-readable medium for generating a layout of a semiconductor device. The method includes placing a first cell in the layout, providing a polysilicon pattern in the first cell extending along a first direction, designating a plurality of tracks on which metal segments can be placed, the plurality of tracks being across the polysilicon pattern and extending along a second direction different from the first direction. Two adjacent tracks of the plurality of tracks are spaced apart by a first pitch. The method further includes determining whether a number of the tracks in the first cell exceeds a predetermined number, and increasing the first pitch of the tracks so as to decrease the number of the tracks in the first cell to the predetermined number.

20 Claims, 11 Drawing Sheets

METHOD AND NON-TRANSITORY COMPUTER-READABLE MEDIUM FOR GENERATING A LAYOUT OF A SEMICONDUCTOR DEVICE

PRIORITY CLAIM AND CROSS-REFERENCE

This application claims the benefit of prior-filed provisional application No. 63/375,698, filed on 15 Sep. 2022.

BACKGROUND

The layout of integrated circuitry (IC) is currently implemented using automatic placement and routing (APR) tools. With the technology evolving, the layout including tall-row height cells or mixed-row height cells can provide a feasible design for performance and area co-optimization in an advanced node. In the existing routing process, even though a cell is increased to be a tall-row height cell, the pitch of tracks still remains as the original design. The layout then may include redundant tracks or metal segments due to the same pitch of tracks. Therefore, an improved method that can reduce tracks for metal segments and optimize the operating speed of the IC is called for.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

DETAILED DESCRIPTION

Figure 1:
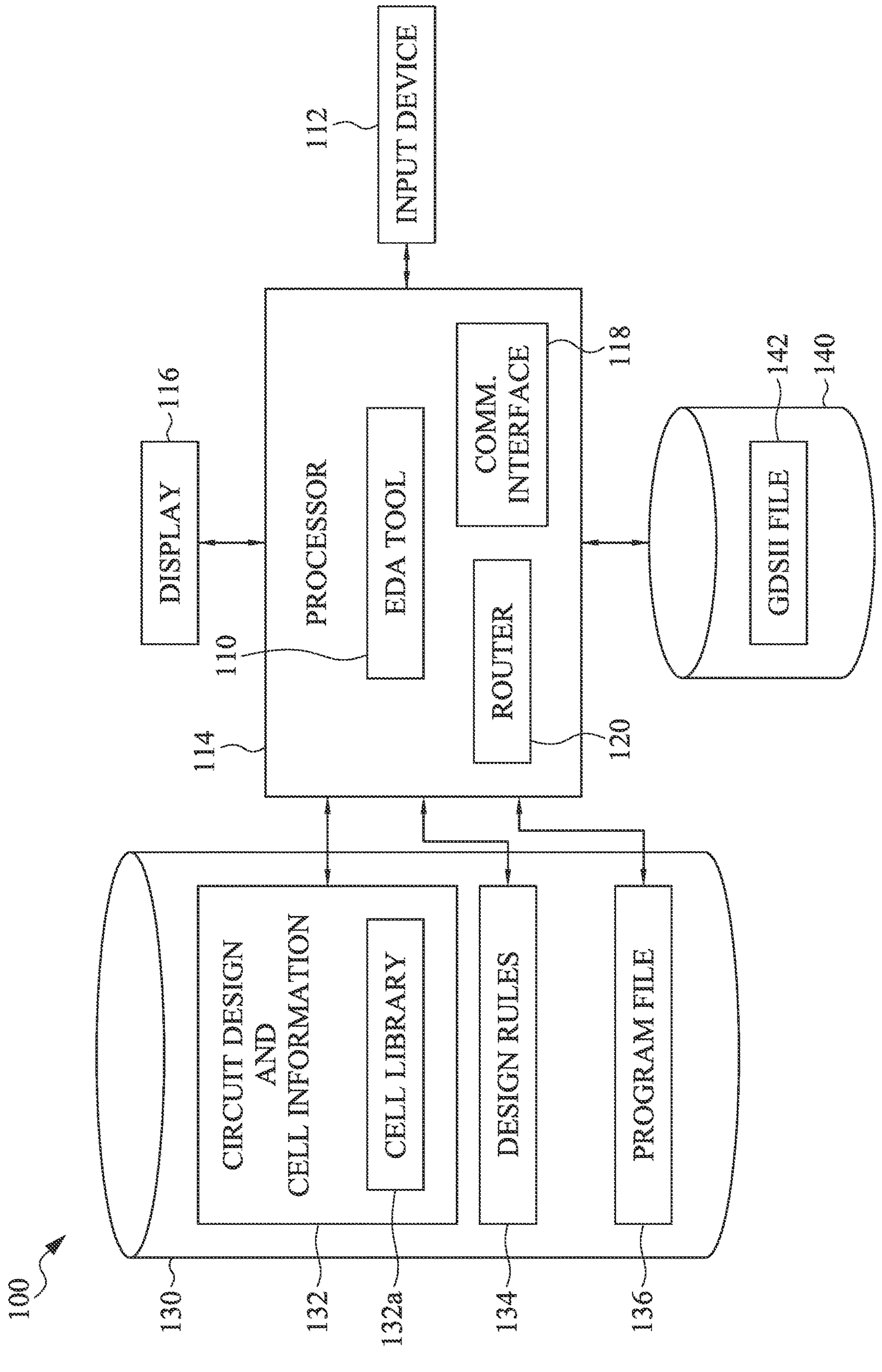
FIG. 1 is a diagram illustrating an electronic design automation system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagram illustrating an electronic design automation system 100 in accordance with some embodiments. As shown in FIG. 1, system 100 includes an electronic design automation ("EDA") tool 110 having a place and route tool including a chip assembly router 120.

The EDA tool 110 is a special purpose computer configured to retrieve stored program instructions 136 from a computer readable storage medium 130 and 140 and execute the instructions on a general purpose processor 114. Processor 114 may be any central processing unit ("CPU"), microprocessor, micro-controller, or computational device or circuit for executing instructions. The non-transitory computer readable storage medium 130 and 140 may be a flash memory, random access memory ("RAM"), read only memory ("ROM"), or other storage medium. Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities.

System 100 may include a display 116 and a user interface or input device 112 such as, for example, a mouse, a touch screen, a microphone, a trackball, a keyboard, or other device through which a user may input design and layout instructions to system 100. The one or more computer readable storage mediums 130 and 140 may store data input by a user such as a circuit design and cell information 132, which may include a cell library 132*a*, design rules 134, one or more program files 136, and one or more graphical data system ("GDS") II files 142.

EDA tool 110 may also include a communication interface 118 allowing software and data to be transferred between EDA tool 110 and external devices. Examples of a communications interface 118 include, but are not limited to, a modem, an Ethernet card, a wireless network card, a Personal Computer Memory Card International Association ("PCMCIA") slot and card, or the like. Software and data transferred via communications interface 118 may be in the form of signals, which may be electronic, electromagnetic, optical, or the like that are capable of being received by communications interface 118. These signals may be provided to communications interface 118 via a communications path (e.g., a channel), which may be implemented using wire, cable, fiber optics, a telephone line, a cellular link, a radio frequency ("RF") link and other communication channels. The communications interface 118 may be a wired link and/or a wireless link coupled to a local area network (LAN) or a wide area network (WAN).

Router 120 is capable of receiving an identification of a plurality of cells to be included in a circuit layout, including a list 132 of pairs of cells. The plurality of cells can be connected to each other. In some embodiments, the list 132 can be selected from the cell library 132*a*. Design rules 134 may be used for a variety of processing technologies. In some embodiments, the design rules 134 configure the router 120 to locate connecting lines and vias on a manufacturing grid. Other embodiments may allow the router to include off-grid connecting lines and/or vias in the layout.

Figure 2:
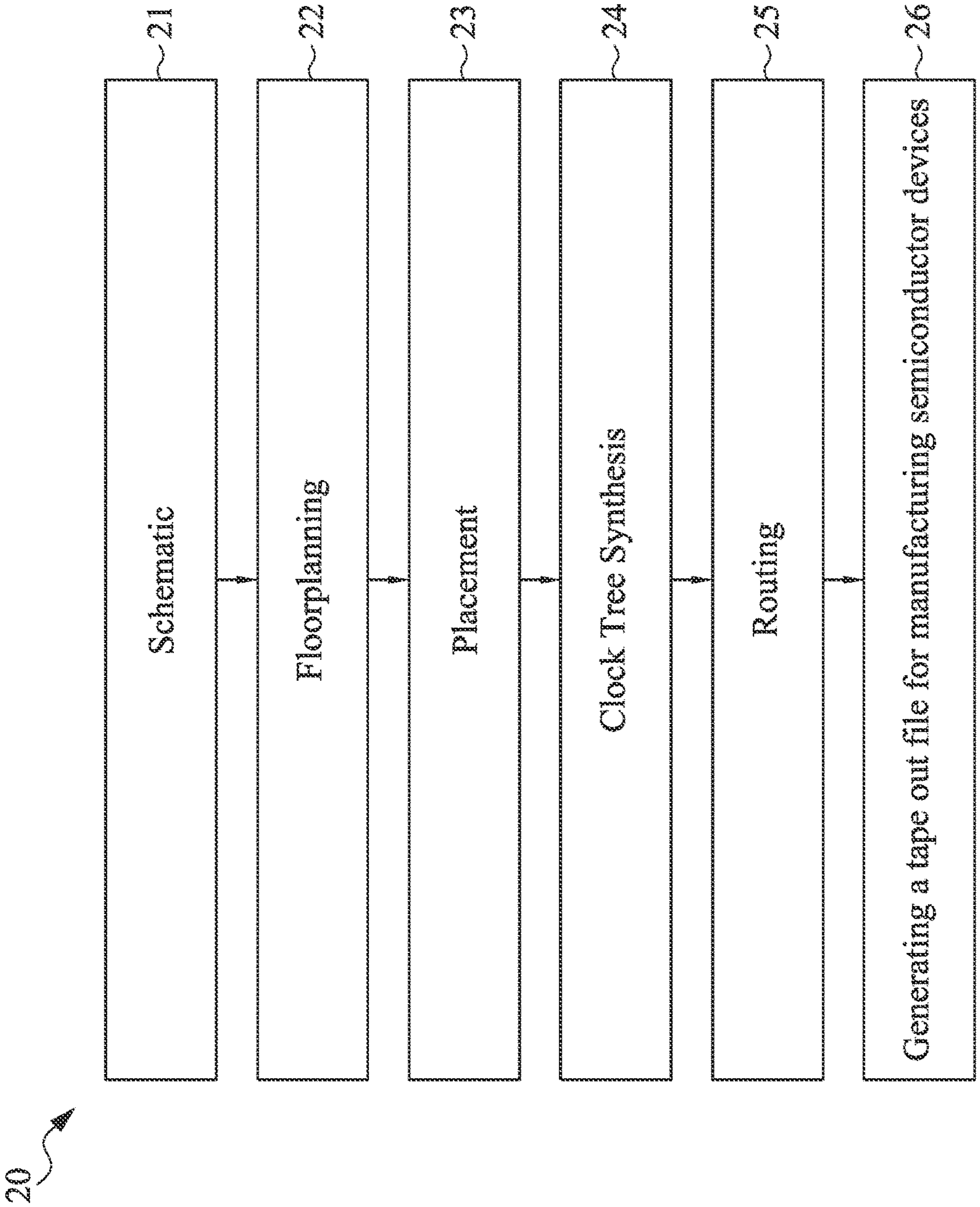
FIG. 2 is a flowchart showing a method for generating an IC layout, in accordance with some embodiments of the present disclosure.

FIG. 2 is a flowchart 20 showing a method for generating an IC layout, in accordance with some embodiments of the present disclosure. In some embodiments, this method may correspond to an automatic placement and routing (APR) process. In some embodiments, the APR process of the present disclosure may be applied to any suitable integrated circuit design layout.

The APR process shown in FIG. 2 may begin in operation 21, initializing a pre-placement of an integrated circuit design layout. For example, the pre-placement simulation may be generated according to design data corresponding to an integrated circuit layout stored in a data storage device. In some embodiments, the pre-placement simulation may be executed on the design, e.g., by an EDA tool, to determine whether the design meets a predetermined specification. If the design does not meet the predetermined specification, the semiconductor device is redesigned. In some embodiments, a SPICE simulation is performed on the SPICE netlist. Other simulation tools can be employed, in place of or in addition to the SPICE simulation, in other embodiments.

In operation 22, floor planning for the integrated circuit is performed, for example, by system 100. In some embodiments, floor planning includes dividing a circuit into functional blocks, which are portions of the circuit, and identifying the layout for these functional blocks.

In operation 23, an automated placement tool may create a transistor level design by placing cells from a cell library to form the various logic and functional blocks according to the IC design. In some embodiments, the system 100 performs placement for the integrated circuit. In some embodiments, operation 23 includes determining the placement for the electronic components, circuitry, and logic elements. For example, the placement of the transistors, resistors, inductors, logic gates, and other elements of the integrated circuit can be selected in operation 23.

In operation 24, Clock Tree Synthesis (CTS) may be performed after the placement of cells. In some embodiments, a CTS tool synthesizes a clock tree for the entire integrated circuit design layout. As it does so, the CTS tool establishes only an approximate position for each buffer forming the clock tree and only approximates the routing of signal paths that will link the buffers to one another and to synchronization, so that it can make reasonably accurate estimates of signal path delays through the clock tree.

In operation 25, an automatic routing tool then determines the connections needed between the devices in the cells, such as MOS transistors. Multiple transistors are coupled together to form functional blocks, such as adders, multiplexers, registers, and the like, in the routing step. Routing comprises the placement of signal net wires on a metal layer within placed cells to carry non-power signals between different functional blocks. In some embodiments, signal net wires are routed on the same metal level as one of the vertically adjacent metal layers in the multilevel power rails.

Once the routing is determined, automated layout tools are used to map the cells and the interconnections from the router onto a semiconductor device using the process rules and the design rules, as provided. All of these software tools are available commercially for purchase. Cell libraries that are parameterized for certain semiconductor wafer manufacturing facilities are also available.

In operation 26, a tape out data file corresponding to an integrated circuit layout of a semiconductor device may be generated. In some embodiments, the integrated circuit design layouts can include FinFET devices and/or other planar or more complex structural semiconductor manufacturing processes.

Figure 3A:
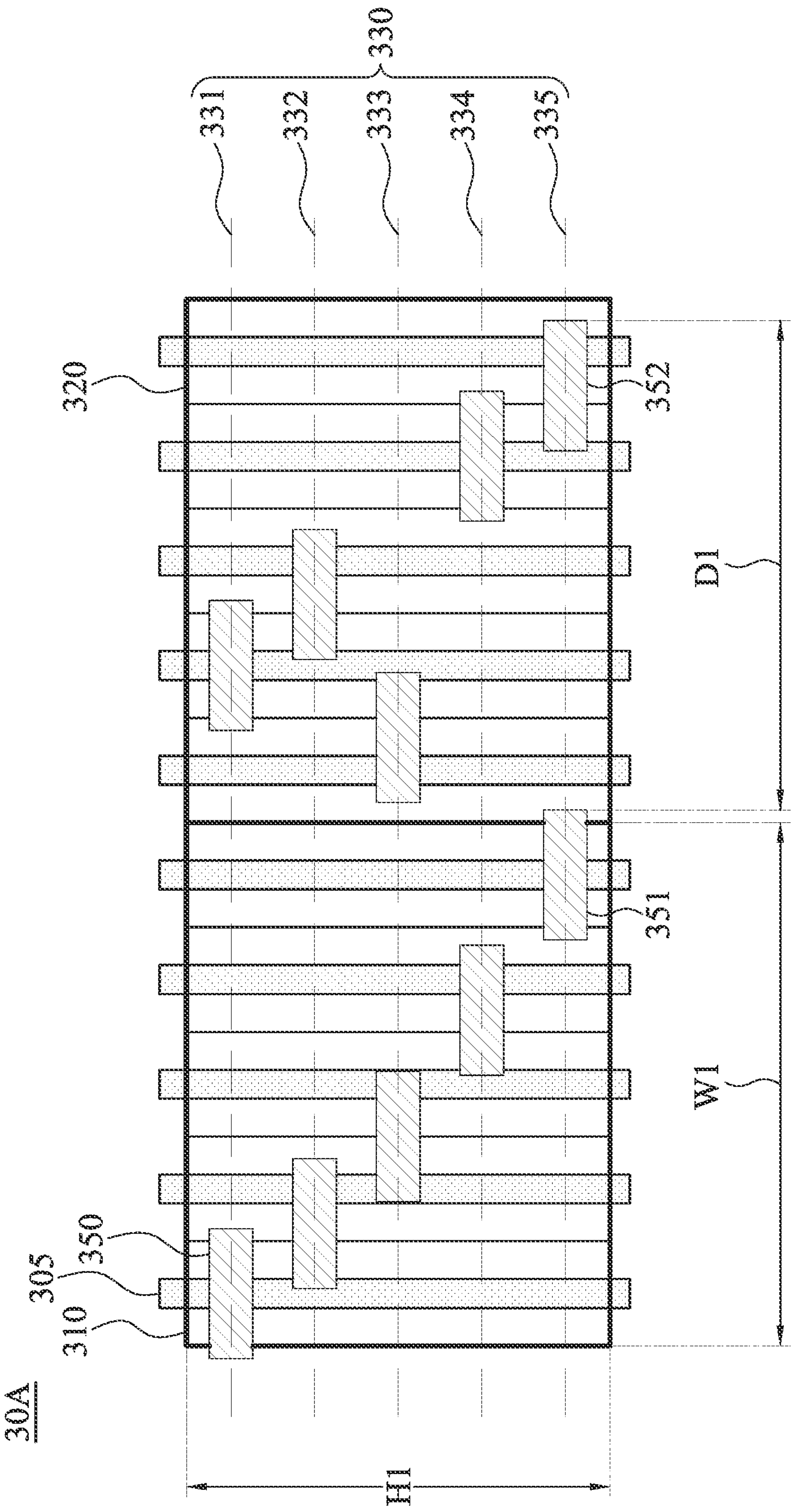
FIG. 3A is a diagram of an IC layout, in accordance with some embodiments of the present disclosure.

FIG. 3A is a diagram of an IC layout 30A, in accordance with some embodiments of the present disclosure. The IC layout 30A may include two cells 310 and 320.

FIG. 3A is a top view of the IC layout 30A. The IC layout 30A can include multiple layers (such as substrate layer, active area, gate electrode, first metal layer (M0), second metal layer (M1), third metal layer (M2), etc.) overlaid with one another along with various patterns in the respective layers. For clarity, some elements (such as active area, metal layers M0 and M1) in the cells 310 and 320 are omitted. The IC layout 30A may include one or more gate electrodes (PO) 305, one or more tracks (M2 track) 330 (including tracks 331, 332, 333, 334, and 335), and one or more conductive segments (M2) 350 (including conductive segments 351 and 352).

The IC layout 30A can include one or more active regions (OD) (not shown). Each of the active regions may include two source/drain regions and a channel region of a transistor (not shown) interposed between the two source/drain regions. The source/drain regions in the active region can be an N-type active region doped with N-type impurities such as arsenic, phosphorus, or the like, or a P-type active region doped with P-type impurities such as boron or the like. The channel region in the active region may be undoped or lightly doped.

In some embodiments, the active region can be defined and laterally surrounded by isolation structures (STI). In some embodiments, the isolation structures are formed of dielectric materials, such as oxide or nitride, and may be referred to as shallow trench isolation. In some embodiments, the active regions and the isolation structures are both disposed on the substrate layer.

Each of the cells 310 and 320 can include one or more gate electrodes 305. For example, the cell 310 can include five gate electrodes 305, and the cell 320 can include five gate electrodes 305 as well. In some embodiments, the cells 310 and 320 can have different numbers of gate electrodes 305. For example, the cell 310 can have more gate electrodes 305 than the cell 320.

The gate electrodes 305 can extend vertically from a top view perspective. In some embodiments, the gate electrodes 305 may be polysilicon patterns. The gate electrodes 305 may be formed of a conductive material, such as doped polysilicon. In some embodiments, the gate electrodes 305 can be formed of a metal gate comprising metallic materials, such as tungsten, and cobalt, and other work function adjusting metals, such as Ti, Al, TiAl, TiN, TaC, and the like. Although not explicitly shown in FIG. 3A, a gate dielectric film formed of dielectric materials may be arranged between the channel region and the gate electrodes 305. In some embodiments, the layer, in which the active regions and gate electrodes 305 are located, may be collectively referred to as a transistor layer.

The cell 310 is disposed adjacent to the cell 320. In some embodiments, the right edge of the cell 310 is adjacent to the left edge of the cell 320. The cell 310 may have a height H1 identical to that of the cell 320. The cell 310 can have a width W1. In some embodiments, the cell 320 can have a width identical to the width W1. In another embodiment, the width of the cell 320 can be different from the width W1 of the cell 310. The cell height (i.e., the height H1) of the cells 310 and 320 can exceed the standard cell for faster operating speed and better performance.

Since the cell 310 may have five gate electrodes 305, the width W1 of the cell 310 can be 5 contact poly pitches (CPP). The cell 320 may also have a width of 5 CPP. That is, the IC layout 30A can have a total width of 10 CPP.

In some embodiments, the conductive segments, such as the conductive segments 350, are allocated into tracks 330 for the cells 310 and 320. Throughout the present disclosure, the term "track" is defined as predetermined regions of the IC layout 30A from a top-view perspective in which conductive segments can be located. In some embodiments, the tracks 330 is in a strip or line profile. The number of parallel tracks 330 and the pitch thereof can be predetermined in order to fulfill design rules.

In some embodiments, the IC layout 330 can include one or more tracks 330 across the gate electrodes 305 in the cells 310 and 320. The tracks 330 can extend horizontally. In some embodiments, the cell 310 may have one or more tracks 330 disposed thereon. The number of tracks 330 is not limited in the cells 310 and 320. For example, the number of tracks 330 in the IC layout 30A may be five. In other embodiments, the number of tracks 330 in the IC layout 30A can be greater than or fewer than five. For example, the IC layout 30A can include five tracks 331, 332, 333, 334, and 335.

Referring to FIG. 3A, a plurality of conductive segments (M2) 350 are arranged on one or more of the tracks 330 in a metal layer M2. The conductive segments 350 may extend horizontally. The number of conductive segments 350 is not limited in the cells 310 and 320. For example, the number of conductive segments 350 in the cells 310 and 320 may be five. In other embodiments, the number of conductive segments 350 in the cells 310 and 320 can be greater than or fewer than five. In some embodiments, the conductive segments 350 may be formed of conductive materials, such as copper, tungsten, aluminum, titanium, tantalum, alloys thereof, or the like.

In some embodiments, the metal layers M0 and M1 (not shown) are disposed between the gate electrodes 305 and the metal layer (such as the metal layer M2), in which the conductive segments 350 are arranged. The conductive segments 350 can be electrically connected to the conductive segments in the metal layers M0 and M1 (not shown).

In some embodiments, the metal layer M1, below the metal layer M2, can include one or more conductive segments extending vertically (not shown). For example, each of the cells 310 and 320 may include five conductive segments in the metal layer M1 connected to the conductive segments 350 in the metal layer M2. In other words, the IC layout 30A can include ten conductive segments in the metal layer M1 connected to the conductive segments 350 in the metal layer M2.

In some embodiments, a number $N_{M2}$ of the conductive segments 350 disposed on one of the tracks 350 can be derived based on a number $T_{M2}$ of the tracks 330 in the layout 30A and a number $N_{M1}$ of the conductive segments in the metal layer M1. The number $N_{M2}$ can be expressed by Eq. 1 as follows.

$$N_{M2} = \frac{N_{M1}}{T_{M2}}, \quad \text{[Eq. 1]}$$

in which $N_{M2}$ represents a number of conductive segments on one track in the metal layer M2 ($N_{M2}$ can be obtained by rounding up the result to an integer); $N_{M1}$ represents a number of conductive segments in the metal layer M1 below the metal layer M2 number; and $T_{M2}$ represents a number of the tracks in the metal layer M2.

Referring to FIG. 3A, for example, the number $N_{M2}$ of the conductive segments 350 on one of the tracks 350 can be determined based on a number $T_{M2}$ of the tracks 330 (such as 5 tracks) and a number $N_{M1}$ of the conductive segments in the metal layer M1 (such as 10). Therefore, the number $N_{M2}$ of the conductive segments 350 per track can be two. In some embodiments, with the number $T_{M2}$ of the tracks 330 having different values and the same number $N_{M1}$ of 10, the number $N_{M2}$ of the conductive segments 350 can be provided in Table 1 as follows.

In some embodiments, the conductive segments 350 are disposed along one or more of the tracks 330. Each of the tracks 350 can include one or more conductive segments 350. For example, two adjacent conductive segments 351 and 352 can be disposed along the track 335. The conductive segments 351 and 352 disposed on the same track 335 can be spaced apart by a distance D1. In some embodiments, the conductive segments 351 and 352 can be spaced apart by a clearance. The distance D1 can be a sum of a minimum clearance and a minimum length of the conductive segments 350. The distance D1 can be a maximum distance between two adjacent conductive segments 351 and 352 on the same track, so that less area is required for the conductive segments 350. Controlling the maximum distance between two adjacent conductive segments on the same track can release the area of the conductive segments 350 efficiently. The distance D1 can be expressed by Eq. 2, as follows.

$$D1 = \frac{W}{N_{M2}}, \quad \text{[Eq. 2]}$$

in which distance D1 represents a maximum distance between two adjacent conductive segments (D1 can be obtained by rounding down the result to an integer); W represents a width of the IC layout; and $N_{M2}$ represents a number of conductive segments on one track.

Referring to FIG. 3A, for example, the distance D1 can be determined based on a width W of the IC layout 30A (such as 10 CPP) and the number $N_{M2}$ of the conductive segments 350 on one of the tracks 350 (such as 2). Therefore, the distance D1 can be 5 CPP. In some embodiments, considering the different numbers $N_{M2}$, the distance D1 can be provided in Table 1 as follows.

TABLE 1

| Number of tracks ($T_{M2}$) | Number of conductive segments per track ($N_{M2}$) | Distance between adjacent conductive segments (D1) |
|---|---|---|
| 5.0 | $\left\lceil \frac{10}{5.0} \right\rceil = 2$ | $\left\lfloor \frac{10}{2} \right\rfloor = 5CPP$ |
| 4.5 | $\left\lceil \frac{10}{4.5} \right\rceil = 3$ | $\left\lfloor \frac{10}{3} \right\rfloor = 3CPP$ |
| 4.0 | $\left\lceil \frac{10}{4.0} \right\rceil = 3$ | $\left\lfloor \frac{10}{3} \right\rfloor = 3CPP$ |
| 3.5 | $\left\lceil \frac{10}{3.5} \right\rceil = 3$ | $\left\lfloor \frac{10}{3} \right\rfloor = 3CPP$ |
| 3.0 | $\left\lceil \frac{10}{3.0} \right\rceil = 4$ | $\left\lfloor \frac{10}{4} \right\rfloor = 2CPP$ |

When increased for higher operating speeds, a cell may include redundant conductive segments due to the pitch, same as the standard cell, and increased cell height. Therefore, the present disclosure provides a method for adjusting the track number in a higher cell. After enlarging the pitch of the tracks for placing the conductive segments, the performance and the operating speed of the tall cell (with increased cell height) can be boosted. Furthermore, the present disclosure also provides design rules to ensure proper connection between different layers of the conductive segments.

Figure 3B:
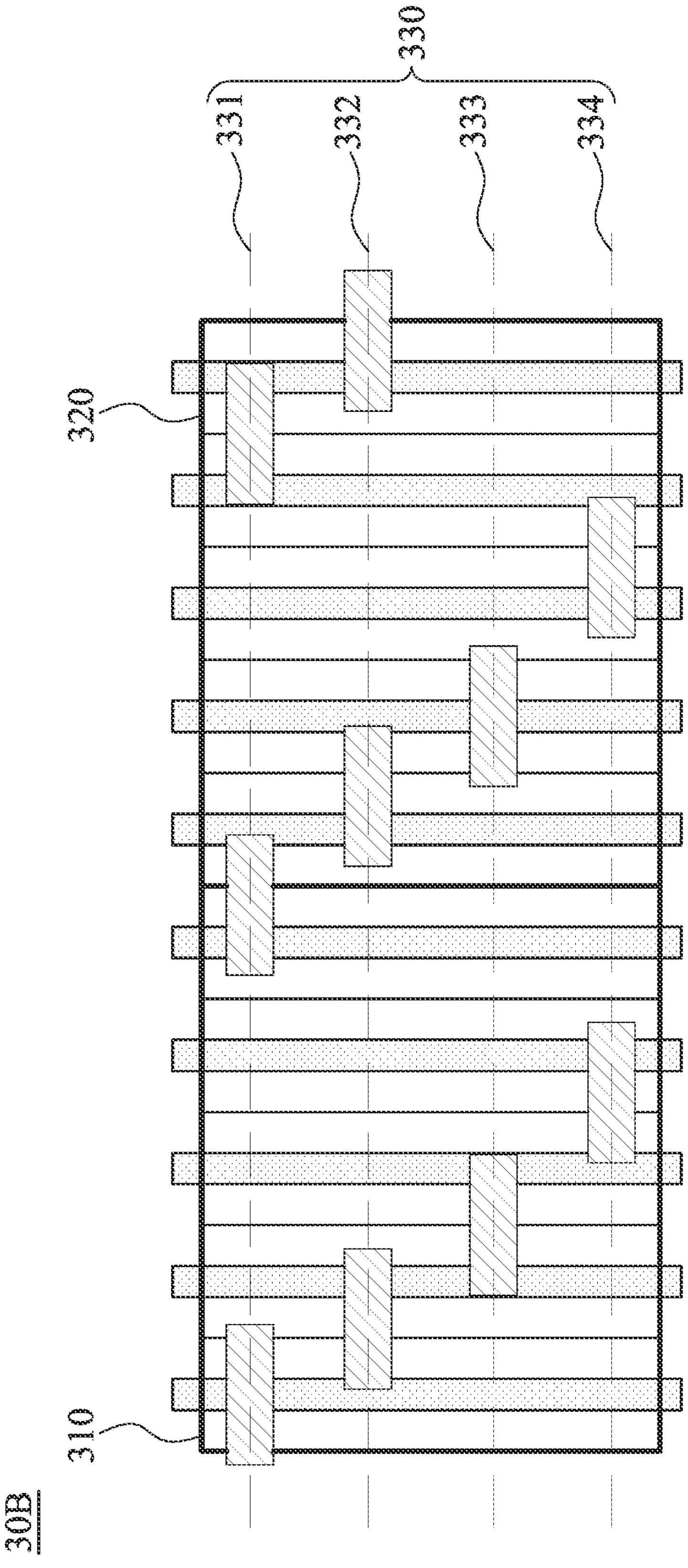
FIG. 3B is a diagram of an IC layout, in accordance with some embodiments of the present disclosure.

FIG. 3B is a diagram of an IC layout 30B, in accordance with some embodiments of the present disclosure. The IC layout 30B is similar to the IC layout 30A in FIG. 3A, differing therefrom in that in FIG. 3B, the IC layout 30B includes four tracks 330 instead of five. In some embodiments, the IC layout 30B represents the arrangement listed in the third row in Table 1. That is, the number $T_{M2}$ of the tracks 330 is 4.0 and the number $N_{M2}$ of the conductive segments 350 per track can be 3.

Referring to FIG. 3B, the cell 310 and 320 can include the same cell height as that in FIG. 3A, but include fewer tracks 330. Therefore, the pitch of the tracks 330 in FIG. 3B can exceed the pitch of the tracks 330 in FIG. 3A.

Figure 4A:
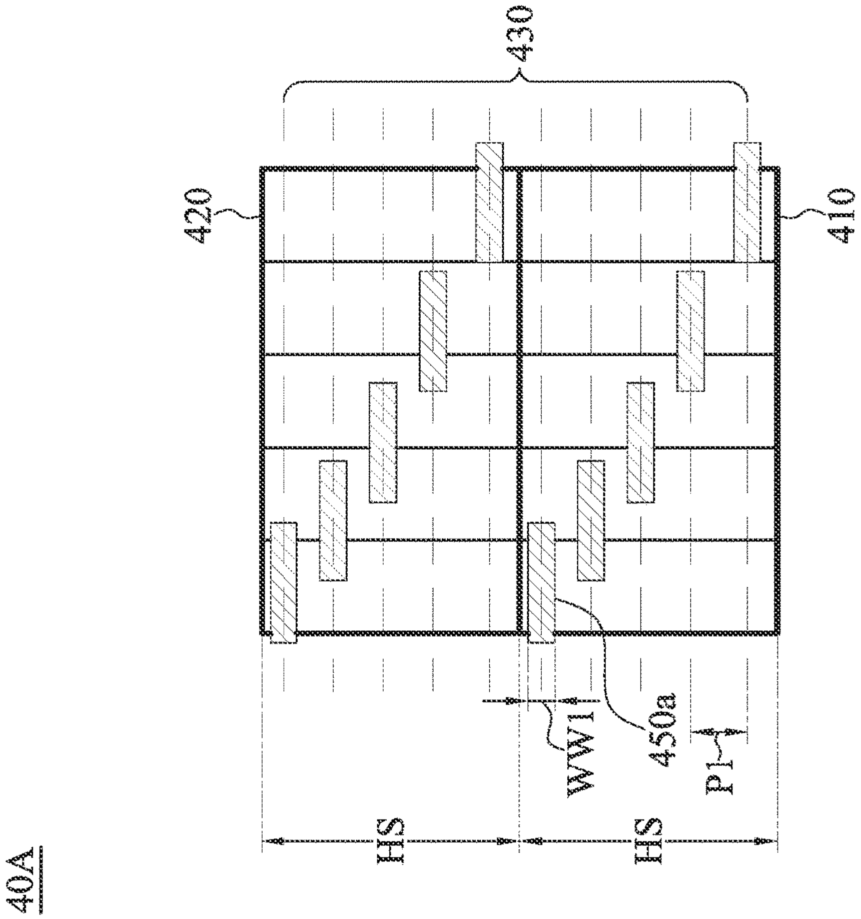
FIGS. 4A, 4B, and 4C are diagrams of a process for modifying an IC layout, in accordance with some embodiments of the present disclosure.
Figure 4B:
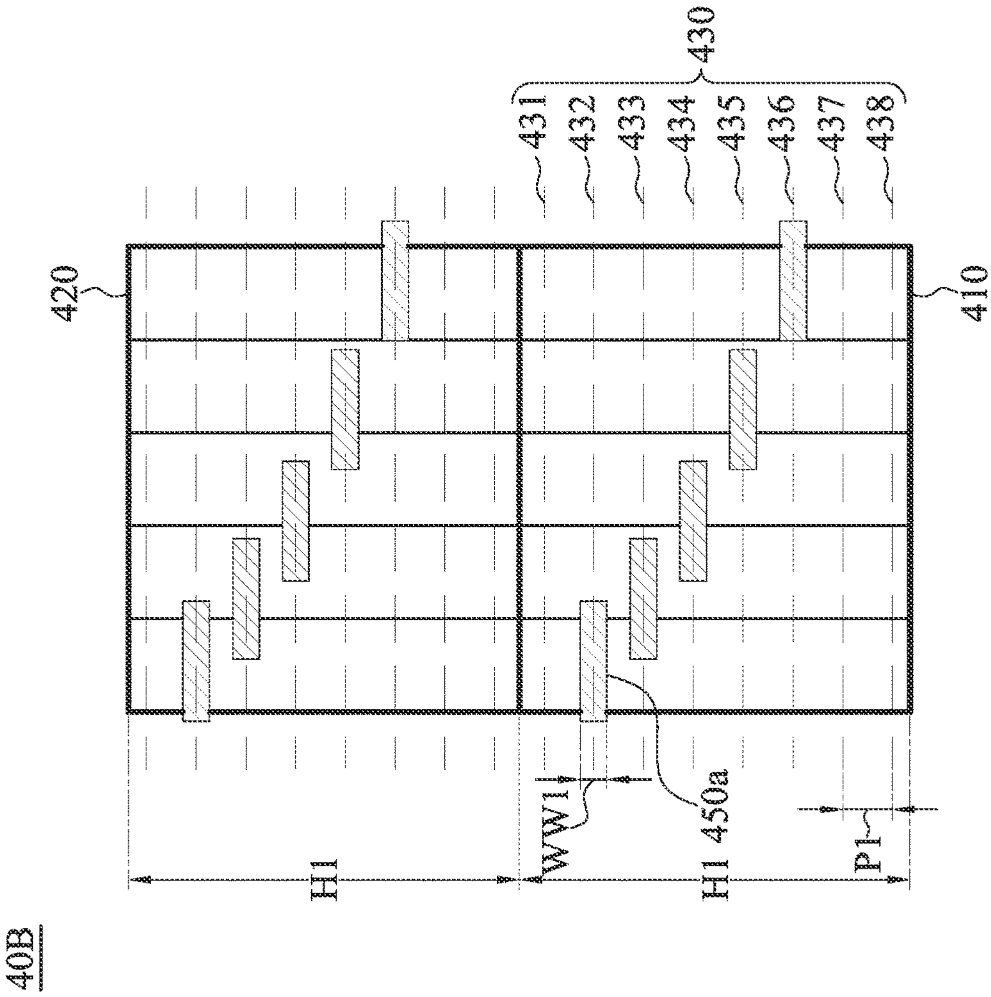
Figure 4C:
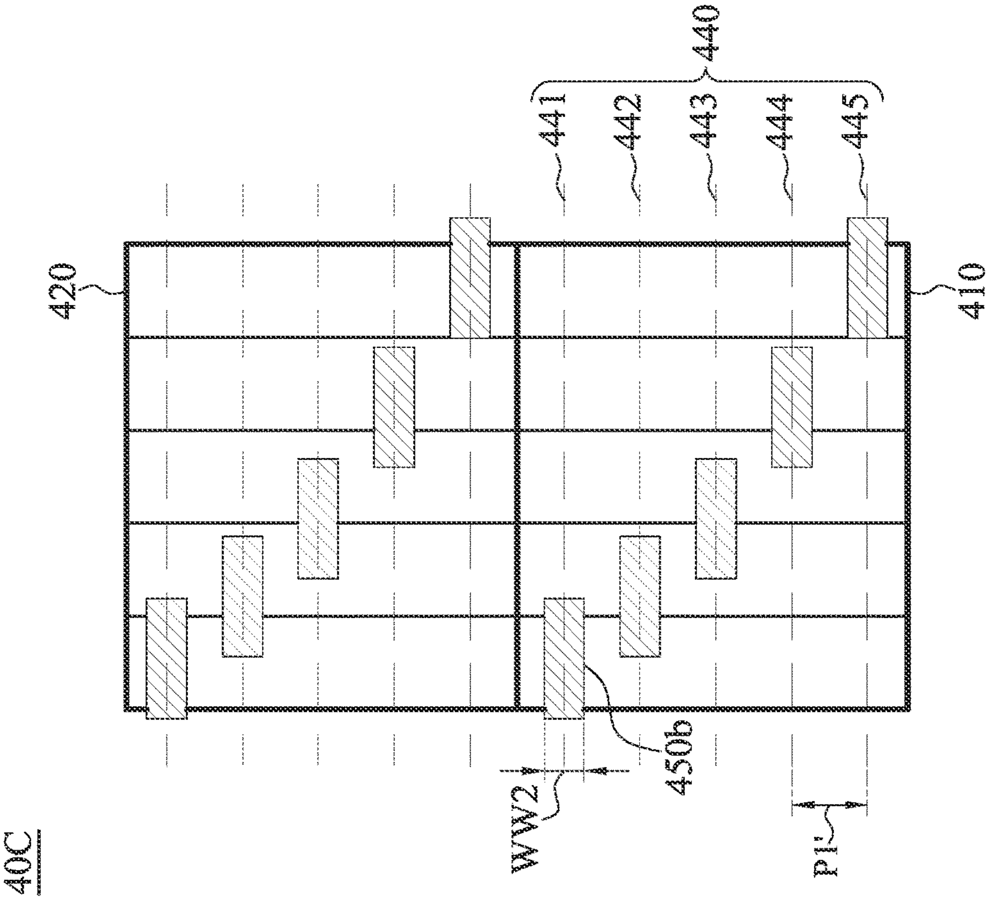

FIGS. 4A, 4B, and 4C are diagrams of a process for modifying an IC layout, in accordance with some embodiments of the present disclosure. The IC layout 40A in FIG. 4A can be modified to the IC layout 40B in FIG. 4B, and then be modified to the IC layout 40C in FIG. 4C, in accordance with some embodiments of the present disclosure. The IC layout 40A includes two cells 410 and 420, tracks 430, and conductive segments 450*a*. Detailed descriptions of those elements can be found in paragraphs associated with FIG. 3A, and thus are not repeated here.

Referring to FIG. 4A, the cell 410 is adjacent to the cell 420 vertically. In some embodiments, the cells 410 and 420 can have the same width. The cells 410 and 420 can have the same cell height HS. In some embodiments, the cell height HS is the standard cell height, and thus the cells 410 and 420 can be referred to standard cells. In some embodiments, each of the cells 410 and 420 can include five tracks 430. The tracks 430 can be spaced apart by a pitch P1. In some embodiments, the IC layout 40A can include ten tracks 430.

One or more conductive segments 450*a* can be placed on the tracks 430. The conductive segments 450*a* can have a width WW1, also called wire width. In some embodiments, the conductive segments 450*a* can have a uniform wire width WW1. For example, the five conductive segments 450*a* in the cell 410 can have the same wire width WW1. In some embodiments, the wire length of the conductive segments 450*a* can be different. In another embodiment, the wire length of the conductive segments 450*a* can be the same.

Referring to FIG. 4B, size of the cells 410 and 420 is increased. In some embodiments, the cell height of the cells 410 and 420 can be increased. The cells 410 and 420 can have the same cell height H1. In some embodiments, the cell height H1 is greater than the cell height HS of the standard cell, and thus the cells 410 and 420 can be referred to tall cells. In some embodiments, the cell height H1 can be 1.1, 1.2, 1.3, 1.4, or 1.5 times the cell height HS.

The cells 410 and 420 can include one or more tracks 430. In some embodiments, each of the cells 410 and 420 can include eight tracks 430. For example, the cell 410 can include eight tracks 431, 432, 433, 434, 435, 436, 437, and 438. In some embodiments, the IC layout 40B can include sixteen tracks 430. Each two of the tracks 430 can be spaced apart by a pitch P1. For example, the track 431 can be spaced apart from the track 432 by the pitch P1. The track 432 can be spaced apart from the track 433 by the pitch P1. The track 433 can be spaced apart from the track 434 by the pitch P1. The track 434 can be spaced apart from the track 435 by the pitch P1. The track 435 can be spaced apart from the track 436 by the pitch P1. The track 436 can be spaced apart from the track 437 by the pitch P1. The track 437 can be spaced apart from the track 438 by the pitch P1. In some embodiments, the pitch P1 in the IC layout 40B can be identical to the pitch P1 in the IC layout 40A.

One or more conductive segments 450*a* can be placed on the tracks 430. For clarity, FIG. 4B only shows ten conductive segments 450*a* in the IC layout 40B, although the number of the conductive segments 450*a* can be more or less. The conductive segments 450*a* can have a wire width WW1, which may be identical to that of the conductive segments in the IC layout 40A. In some embodiments, the conductive segments 450*a* in the cell 410 can have the same wire width WW1. In some embodiments, the wire length of the conductive segments 450*a* can be different. In another embodiment, the wire length of the conductive segments 450*a* can be the same.

Referring to FIG. 4C, the pitch P1 between adjacent tracks can be increased so as to decrease the number of tracks in the cell. Each of the cells 410 and 420 can include one or more tracks 440. The tracks 440 are similar to the tracks 430 in the IC layout 40B, differing therefrom in that the pitch P1' of the tracks 440 exceeds the pitch P1 of the tracks 430. In some embodiments, the cell 410 includes five tracks 441, 442, 443, 444, and 445. In some embodiments, the IC layout 40C can include ten tracks 440. Two adjacent ones of the tracks 440 can be spaced apart by a pitch P1'. For example, the track 441 can be spaced apart from the track

442 by the pitch P1'. The track 442 can be spaced apart from the track 443 by the pitch P1'. The track 443 can be spaced apart from the track 444 by the pitch P1'. The track 444 can be spaced apart from the track 445 by the pitch P1'. In some embodiments, the pitch P1' in the IC layout 40C can exceed the pitch P1 in the IC layout 40B.

One or more conductive segments 450*b* can be placed on the tracks 440. The conductive segments 450*b* can have a wire width WW2. The wire width WW2 can exceed the wire width WW1 of the conductive segments in the IC layout 40B. In some embodiments, each of the conductive segments 450*b* in the cell 410 can have the same wire width WW2. In some embodiments, the wire length of the conductive segments 450*b* can be identical to that of the conductive segments 450*a*. In another embodiment, the wire length of the conductive segments 450*b* can be less than that of the conductive segments 450*a* in the IC layout 40B.

When the cell height is increased and the tracks maintain the original pitch, the number of tracks for placing conductive segments in one cell may exceed the number needed. Therefore, some of the tracks may be redundant. To release the area and increase the operating speed, the pitch of the tracks can be increased so as to decrease the number of tracks in the cell. Accordingly, the conductive segments 440 can be wider and shorter with fewer tracks in the cell, and thus can boost the operating speed.

Figure 5B:
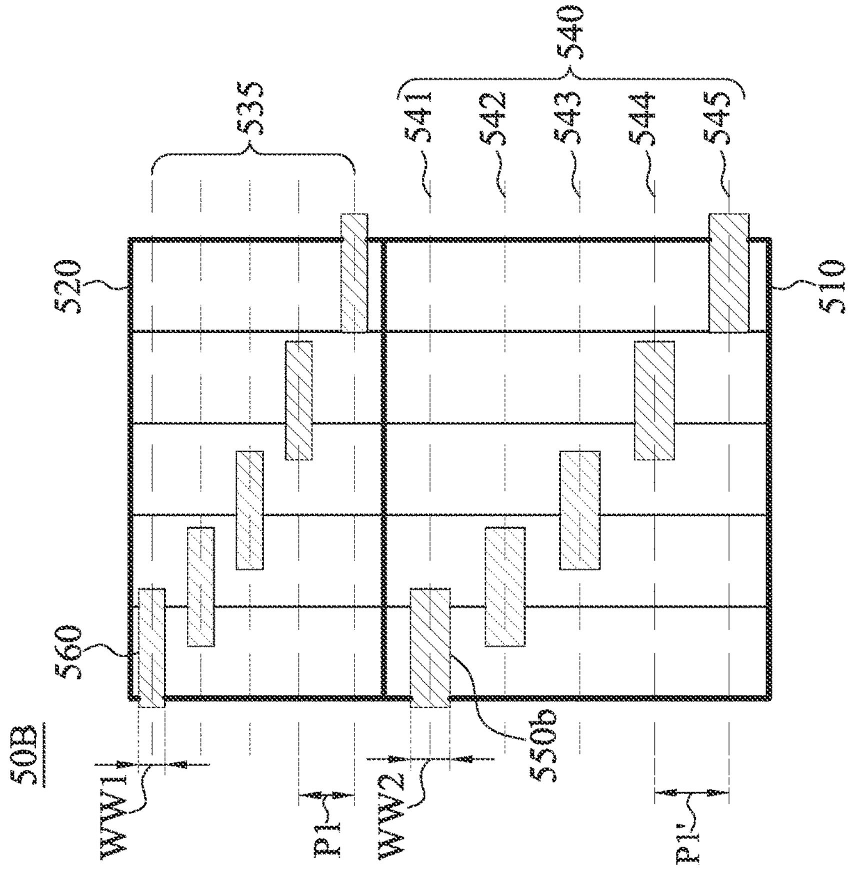
FIGS. 5A and 5B are diagrams of a process for modifying an IC layout, in accordance with some embodiments of the present disclosure.
Figure 5A:
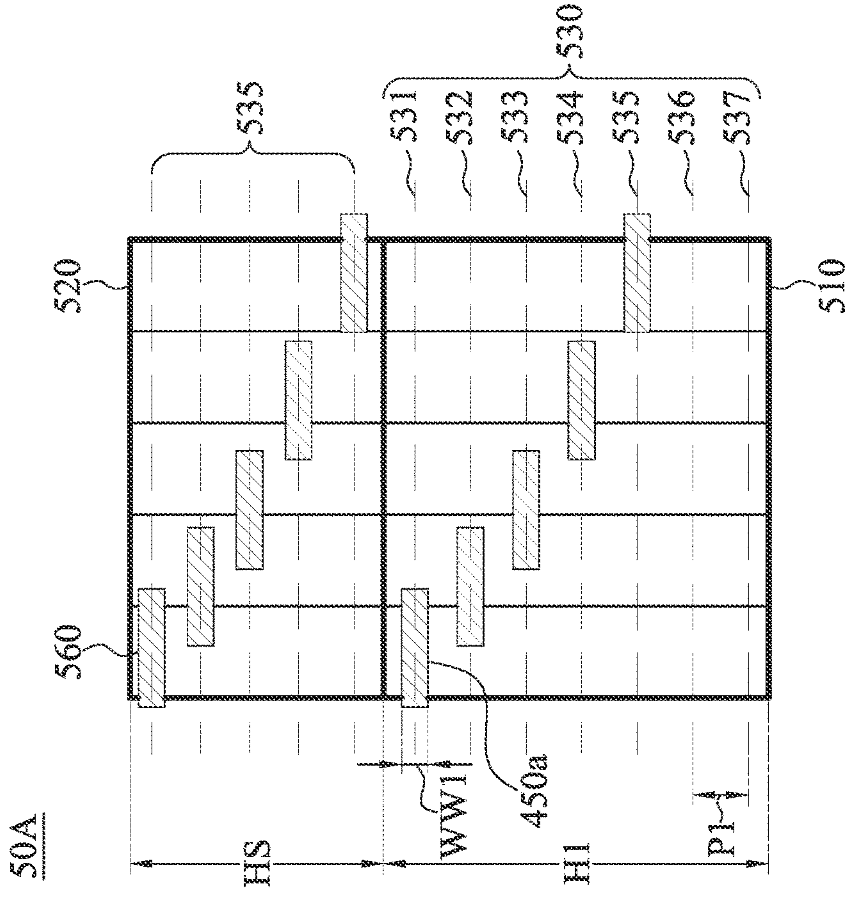

FIGS. 5A and 5B are diagrams of a process for modifying an IC layout, in accordance with some embodiments of the present disclosure. The IC layout 50A in FIG. 5A can be modified to the IC layout 50B in FIG. 5B, in accordance with some embodiments of the present disclosure. The IC layout 50A includes two cells 510 and 520, tracks 530 and 535, and conductive segments 550*a* and 560. Detailed descriptions of those elements can be found in paragraphs associated with FIG. 3A, and thus are not repeated here.

Referring to FIG. 5A, the cell 510 is adjacent to the cell 520 vertically. In some embodiments, the cells 510 and 520 can have the same width. The cells 510 and 520 can have different cell heights. The cell 510 can be a tall cell, having a cell height H1. The cell 520 can be a standard cell 520, having a cell height HS. In some embodiments, the cell height H1 exceeds the cell height HS. Accordingly, the IC layout 50A can be a mixed-row height configuration.

In some embodiments, the cell 510 can include seven tracks 530. The cell 520 can include five tracks 535. Two adjacent tracks of the tracks 530 and 535 can be spaced apart by a pitch P1. In some embodiments, the IC layout 50A can include twelve tracks.

One or more conductive segments 550*a* can be placed on the tracks 530 in the cell 510. The conductive segments 550*a* can have a wire width WW1. In some embodiments, each of the conductive segments 550*a* can have the same wire width WW1. For example, the conductive segments 550*a* in the cell 510 can have the same wire width WW1. In some embodiments, the wire length of the conductive segments 550*a* can be different. In another embodiment, the wire length of the conductive segments 550*a* can be the same.

One or more conductive segments 560 can be placed on the tracks 535 in the cell 520. The conductive segments 560 can have a wire width identical to the wire width WW1 of the conductive segments 550*a*. In some embodiments, the wire length of the conductive segments 560 can be different or equal to that of the conductive segments 550*a*.

Referring to FIG. 5B, the pitch P1 between adjacent tracks 530 can be increased so as to decrease the number of tracks in the cell 510. The cell 510 can include one or more tracks 540. The tracks 540 are similar to the tracks 530 in the IC layout 50A, differing therefrom in that the pitch P1' of the tracks 540 exceeds the pitch P1 of the tracks 530. In some embodiments, the cell 510 includes five tracks 541, 542, 543, 544, and 545. The cell 520 includes five tracks 535. In some embodiments, the IC layout 50B can include ten tracks.

Two adjacent ones of the tracks 535 can be spaced apart by the pitch P1. Two adjacent ones of the tracks 540 can be spaced apart by a pitch P1'. For example, the track 541 can be spaced apart from the track 542 by the pitch P1'. The track 542 can be spaced apart from the track 543 by the pitch P1'. The track 543 can be spaced apart from the track 544 by the pitch P1'. The track 544 can be spaced apart from the track 545 by the pitch P1'. In some embodiments, the pitch P1' in the IC layout 50B can exceed the pitch P1 in the IC layout 50A.

One or more conductive segments 560 can be placed on the tracks 535 in the cell 520. The conductive segments 560 can have the wire width WW1. One or more conductive segments 550*b* can be placed on the tracks 540. The conductive segments 550*b* can have a wire width WW2. The wire width WW2 can exceed the wire width WW1 of the conductive segments 550*a* in the IC layout 50A. In some embodiments, each of the conductive segments 550*b* in the cell 510 can have the same wire width WW2. In some embodiments, the wire length of the conductive segments 550*b* can be identical to that of the conductive segments 550*a*. In another embodiment, the wire length of the conductive segments 550*b* can be less than that of the conductive segments 550*a* in the IC layout 50A.

To release device area and increase operating speed, the pitch of the tracks can be increased so as to decrease the number of tracks in the tall cell. Accordingly, the conductive segments 540 can be wider and shorter with fewer tracks in the cell, and thus can boost the operating speed. This technology can also be applicable to mixed-row height configuration. Therefore, the method for generating the IC layout can be more flexible.

Figure 6:
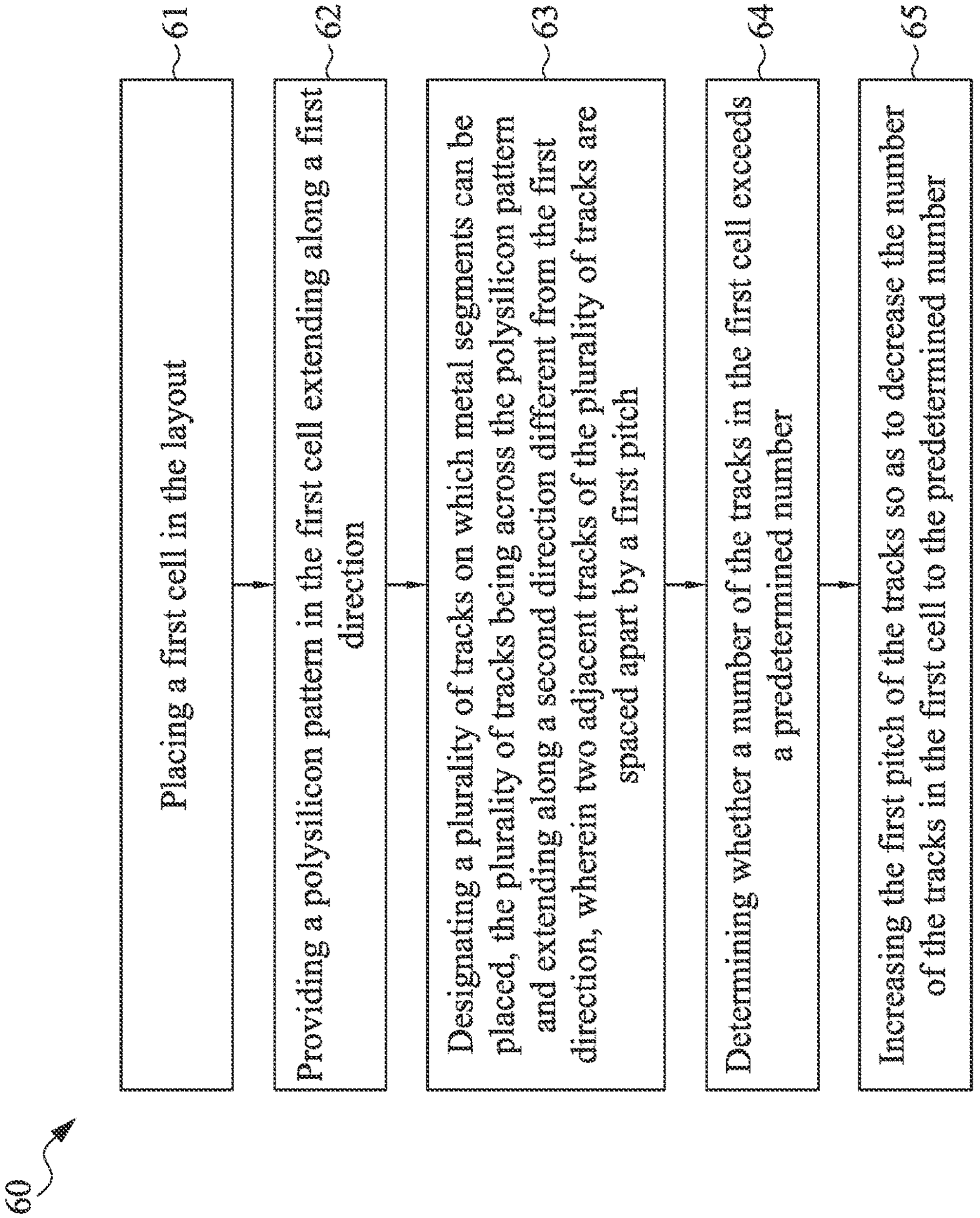
FIG. 6 is a flowchart of a method for generating a layout of a semiconductor device, in accordance with some embodiments of the present disclosure.

FIG. 6 is a flowchart of a method 60 for generating a layout of a semiconductor device, in accordance with some embodiments of the present disclosure. The method 60 includes operations 61, 62, 63, 64, and 65. The method 60 can be operated by the system as shown in FIG. 1.

In operation 61, a first cell is placed in the layout. In some embodiments, the first cell is a tall cell. The first cell can be referred to the cell 410 in FIG. 4B. In some embodiments, the first cell can have a cell height greater than that of the standard cell.

In operation 62, a polysilicon pattern is provided in the first cell. In some embodiments, the polysilicon can extend along a first direction. For example, the polysilicon in the first cell can extend vertically.

In operation 63, a plurality of tracks, on which metal segments can be placed, can be designated. The plurality of tracks can be across the polysilicon pattern and extend along a second direction different from the first direction. In some embodiments, the plurality of tracks can extend horizontally. In one embodiment, two adjacent tracks of the plurality of tracks are spaced apart by a first pitch. The first pitch can be referred to the pitch P1 shown in FIG. 4B.

In operation 64, whether a number of tracks in the first cell exceeds a predetermined number can be determined. Referring to FIG. 4B, the cell 410 can include eight tracks, while the predetermined number may be five for example. Therefore, the number of tracks in the cell 410 can exceed the predetermined number.

In operation 65, the first pitch of the tracks can be increased so as to decrease the number of tracks in the first cell to the predetermined number. Referring to FIG. 4C, the first pitch of the tracks can be increased to the pitch P1'. Therefore, the number of tracks in the cell 410 can be decreased to the predetermined number, i.e., five.

Figure 7:
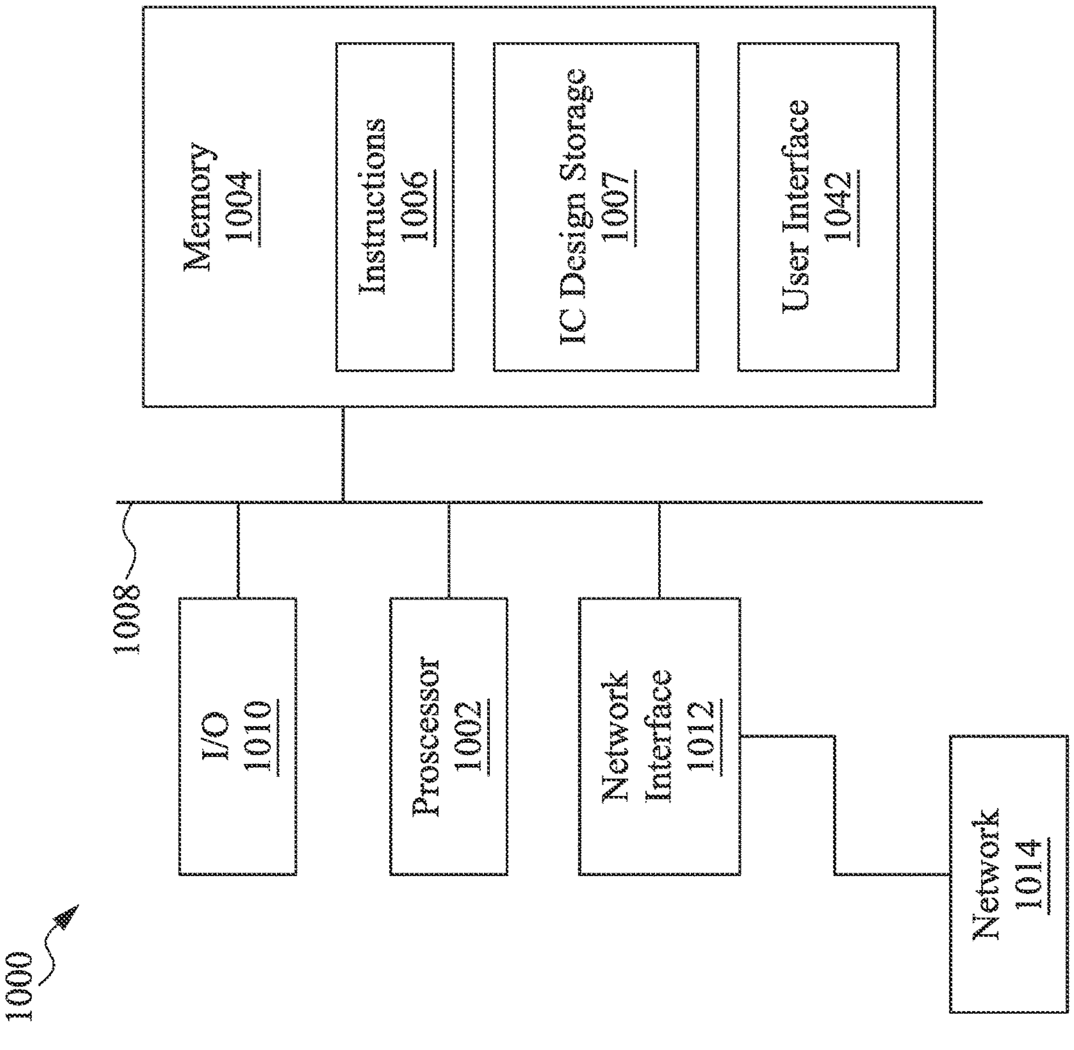
FIG. 7 is a block diagram of an IC layout diagram generation system, in accordance with some embodiments.

FIG. 7 is a block diagram of IC design system 1000, in accordance with some embodiments. Methods described herein of designing IC layout diagrams in accordance with one or more embodiments are implementable, for example, using IC design system 1000, in accordance with some embodiments. In some embodiments, IC design system 1000 can be an APR system, can include an APR system, or can be a part of an APR system, usable for performing an APR method.

In some embodiments, IC design system 1000 includes a processor 1002 and non-transitory, computer-readable memory 1004. Memory 1004, amongst other things, is encoded with, i.e., stores, computer program code, i.e., a set of executable instructions 1006. Execution of instructions 1006 by the processor 1002 represents (at least in part) an EDA tool which implements a portion or all of a method, e.g., a method of generating an IC layout diagram described above (hereinafter, the noted processes and/or methods).

Processor 1002 is electrically coupled to computer-readable memory 1004 via a bus 1008. Processor 1002 is also electrically coupled to an I/O interface 1010 by bus 1008. Network interface 1012 is also electrically connected to processor 1002 via bus 1008. Network interface 1012 is connected to a network 1014, so that processor 1002 and computer-readable memory 1004 are capable of connecting to external elements via network 1014. Processor 1002 is configured to execute instructions 1006 encoded in computer-readable memory 1004 in order to cause IC design system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, memory 1004 is an electronic, magnetic, optical, electromagnetic, infrared, and/or a semiconductor system (or apparatus or device). For example, memory 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, memory 1004 includes a compact disk-read only memory (CD-ROM), a compact disk-read/write (CD-R/W), and/or a digital video disc (DVD).

In one or more embodiments, memory 1004 stores instructions 1006 configured to cause IC design system 1000 (where such execution represents (at least in part) the EDA tool) to be usable for performing a portion or all of the noted processes and/or methods. In one or more embodiments, memory 1004 also stores information which facilitates performing a portion or all of the noted processes and/or methods. In one or more embodiments, memory 1004 includes IC design storage 1007 configured to store one or more IC layout diagrams.

IC design system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

IC design system 1000 also includes network interface 1012 coupled to processor 1002. Network interface 1012 allows IC design system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC design systems 1000.

IC design system 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. IC design system 1000 is configured to receive information related to a UI through I/O interface 1010. The information is stored in memory 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC design system 1000. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
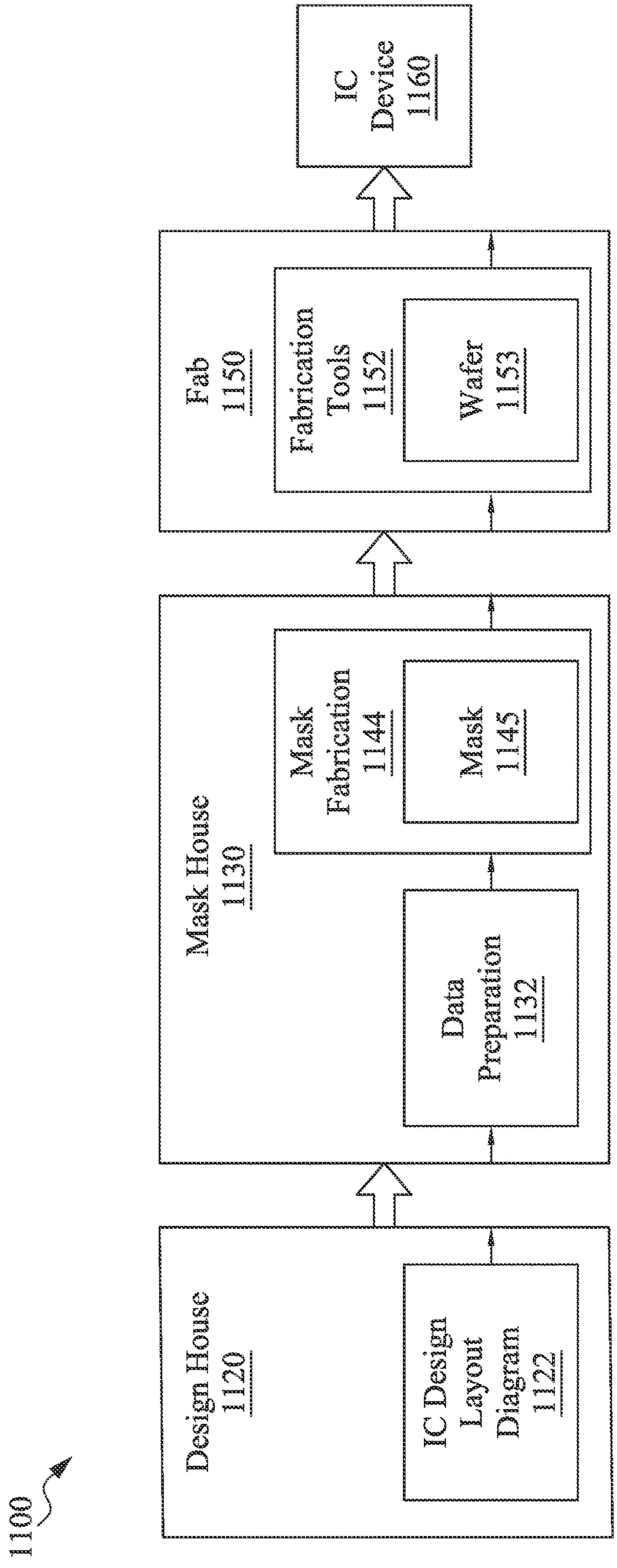
FIG. 8 is a block diagram of an IC manufacturing system, and an IC manufacturing flow associated therewith, in accordance with some embodiments.

FIG. 8 is a block diagram of IC manufacturing system 1100, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 1100.

In FIG. 8, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC layout diagram 1122. IC layout diagram 1122 includes various geometrical patterns, e.g., an IC layout diagram discussed above. The geometrical patterns correspond to patterns of metal, oxide, or semiconductor layers that make up the various components of IC device 1160 to be fabricated. The various layers combine to form various IC features. For example, a portion of IC layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC layout diagram 1122. The design procedure includes one or more of logic design, physical design or place and route. IC layout diagram 1122 is presented in one or more data files having information of the geometrical patterns. For example, IC layout diagram 1122 can be expressed in a GDSII file format or DFII file format.

Mask house 1130 includes data preparation 1132 and mask fabrication 1144. Mask house 1130 uses IC layout diagram 1122 to manufacture one or more masks 1145 to be used for fabricating the various layers of IC device 1160 according to IC layout diagram 1122. Mask house 1130 performs mask data preparation 1132, where IC layout diagram 1122 is translated into a representative data file (RDF). Mask data preparation 1132 provides the RDF to mask fabrication 1144. Mask fabrication 1144 includes a mask writer. A mask writer converts the RDF to an image on a substrate, such as mask (reticle) 1145 or a semiconductor wafer 1153. The design layout diagram 1122 is manipulated by mask data preparation 1132 to comply with particular characteristics of the mask writer and/or requirements of IC fab 1150. In FIG. 8, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC layout diagram 1122.

It should be understood that the description of mask data preparation 1132 has been simplified for the purposes of clarity. In some embodiments, data preparation 1132 includes additional features such as a logic operation (LOP) to modify the IC layout diagram 1122 according to manufacturing rules. Additionally, the processes applied to IC layout diagram 1122 during data preparation 1132 may be executed in a variety of different orders.

After mask data preparation 1132 and during mask fabrication 1144, a mask 1145 or a group of masks 1145 are fabricated based on the modified IC layout diagram 1122. In some embodiments, mask fabrication 1144 includes performing one or more lithographic exposures based on IC layout diagram 1122. In some embodiments, an electron-beam (e-beam) or a mechanism of multiple e-beams is used to form a pattern on a mask (photomask or reticle) 1145 based on the modified IC layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 is an IC fabrication business that includes one or more manufacturing facilities for the fabrication of a variety of different IC products. In some embodiments, IC Fab 1150 is a semiconductor foundry. For example, there may be a manufacturing facility for the front-end fabrication of a plurality of IC products (front-end-of-line (FEOL) fabrication), while a second manufacturing facility may provide the back end fabrication for the interconnection and packaging of the IC products (back-end-of-line (BEOL)

fabrication), and a third manufacturing facility may provide other services for the foundry business.

IC fab 1150 includes wafer fabrication tools 1152 configured to execute various manufacturing operations on semiconductor wafer 1153 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1150 uses mask(s) 1145 fabricated by mask house 1130 to fabricate IC device 1160. Thus, IC fab 1150 at least indirectly uses IC layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC layout diagram 1122. Semiconductor wafer 1153 includes a silicon substrate or other proper substrate having material layers formed thereon. Semiconductor wafer 1153 further includes one or more of various doped regions, dielectric features, multilevel interconnects, and the like (formed at subsequent manufacturing steps).

According to some embodiments, a method for generating a layout of a semiconductor device. The method includes placing a first cell in the layout, providing a polysilicon pattern in the first cell extending along a first direction, designating a plurality of tracks on which metal segments can be placed, the plurality of tracks being across the polysilicon pattern and extending along a second direction different from the first direction. Two adjacent tracks of the plurality of tracks are spaced apart by a first pitch. The method further includes determining whether a number of tracks in the first cell exceeds a predetermined number, and increasing the first pitch of the tracks so as to decrease the number of tracks in the first cell to the predetermined number.

According to another embodiment, a method for generating a layout of a semiconductor device. The method includes placing a first cell and a second cell adjacent to the first cell in the layout, where the first cell has a first height different from a second height of the second cell, disposing a first polysilicon pattern in the first cell extending along a first direction and a second polysilicon pattern in the second cell extending along the first direction, designating a plurality of first tracks in the first cell extending along a second direction different from the first direction, and designating a plurality of second tracks in the second cell extending along the second direction. Two adjacent ones of the plurality of first tracks are spaced apart by a first pitch, and two adjacent ones of the plurality of second tracks are spaced apart by a second pitch, where the first pitch is greater than the second pitch.

According to other embodiments, a non-transitory computer-readable medium is provided. The non-transitory computer-readable medium stores computer-executable instructions. When the computer-executable instructions are executed on a computer system, the computer system is caused to: place a first cell and a second cell adjacent to the first cell in the layout, wherein the first cell has a first height different from a second height of the second cell; dispose a first polysilicon pattern in the first cell extending along a first direction and a second polysilicon pattern in the second cell extending along the first direction; designate a plurality of first tracks in the first cell extending along a second direction different from the first direction; and designate a plurality of second tracks in the second cell extending along the second direction. Two adjacent ones of the plurality of first tracks are spaced apart by a first pitch, and two adjacent ones of the plurality of second tracks are spaced apart by a second pitch, where the first pitch exceeds the second pitch.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A method for generating a layout of a semiconductor device, comprising:

placing a first cell and a second cell adjacent to the first cell in the layout, wherein the first cell has a first height different from a second height of the second cell;

disposing a first polysilicon pattern in the first cell extending along a first direction and a second polysilicon pattern in the second cell extending along the first direction;

designating a plurality of first tracks in the first cell extending along a second direction different from the first direction;

disposing a plurality of first metal segments on one or more of the plurality of first tracks, wherein two adjacent metal segments of the plurality of first metal segments disposed on the same track in the first cell are spaced apart by a distance;

designating a plurality of second tracks in the second cell extending along the second direction generating a tape out file for manufacturing the semiconductor device according to the layout, wherein two adjacent ones of the plurality of first tracks are spaced apart by a first pitch, and two adjacent ones of the plurality of second tracks are spaced apart by a second pitch, wherein the first pitch is greater than the second pitch.

2. The method of claim 1, wherein the distance is determined based on a width of the first cell and a number of the plurality of first metal segments in the same track in the first cell.

3. The method of claim 1, further comprising disposing a plurality of second metal segments on one or more of the plurality of second tracks, wherein the plurality of first metal segments has a width greater than a width of the plurality of second metal segments.

4. The method of claim 1, wherein the first height of the first cell in the layout exceeds the second height of the second cell in the layout.

5. The method of claim 1, wherein the plurality of first tracks in the first cell has a number identical to that of the plurality of second tracks in the second cell.

6. The method of claim 1, wherein a number of the plurality of first tracks is less than or equal to five.

7. The method of claim 1, wherein an operating speed of the first cell is greater than an operating speed of the second cell.

8. A non-transitory computer-readable medium storing computer-executable instructions, when the computer-executable instructions are executed on a computer system, the computer system is caused to:

place a first cell and a second cell adjacent to the first cell in the layout, wherein the first cell has a first height different from a second height of the second cell;

dispose a polysilicon pattern in the first cell extending along a first direction;

designate a plurality of first tracks in the first cell extending along a second direction different from the first direction;

disposing a plurality of first metal segments on the plurality of first tracks, wherein two adjacent metal segments of the plurality of first metal segments disposed on the same track in the first cell are spaced apart by a distance;

designate a plurality of second tracks in the second cell extending along the second direction generating a tape out file for manufacturing the semiconductor device according to the layout, wherein two adjacent ones of the plurality of first tracks are spaced apart by a first pitch, and two adjacent ones of the plurality of second tracks are spaced apart by a second pitch, wherein the first pitch is greater than the second pitch.

9. The non-transitory computer-readable medium of claim 8, wherein the computer system is further caused to:

dispose a plurality of second metal segments on the plurality of second tracks, wherein the plurality of first metal segments has a width greater than a width of the plurality of second metal segments.

10. The non-transitory computer-readable medium of claim 8, wherein the plurality of first tracks in the first cell has a number identical to that of the plurality of second tracks in the second cell.

11. The non-transitory computer-readable medium of claim 8, wherein the distance is determined based on a width of the first cell and a number of the plurality of first metal segments in the same track in the first cell.

12. The non-transitory computer-readable medium of claim 8, wherein the first height of the first cell in the layout exceeds the second height of the second cell in the layout.

13. The non-transitory computer-readable medium of claim 8, wherein an operating speed of the first cell is greater than an operating speed of the second cell.

14. A method for generating a layout of a semiconductor device, comprising:

placing a first cell and a second cell adjacent to the first cell in the layout, wherein the first cell has a first height different from a second height of the second cell;

disposing a plurality of gate electrodes in the first cell extending along a first direction;

designating a plurality of first tracks in the first cell extending along a second direction different from the first direction;

disposing a plurality of first metal segments on one or more the plurality of first tracks, wherein two adjacent metal segments of the plurality of first metal segments disposed on the same track in the first cell are spaced apart by a distance;

designating a plurality of second tracks in the second cell extending along the second direction generating a tape out file for manufacturing the semiconductor device according to the layout, wherein two adjacent ones of the plurality of first tracks are spaced apart by a first pitch, and two adjacent ones of the plurality of second tracks are spaced apart by a second pitch, wherein the first pitch is different from the second pitch.

15. The method of claim 14, wherein the distance is determined based on a width of the first cell and a number of the plurality of first metal segments in the same track in the first cell.

16. The method of claim 14, further comprising disposing a plurality of second metal segments on one or more of the plurality of second tracks, wherein the plurality of first metal segments has a width greater than a width of the plurality of second metal segments.

17. The method of claim 14, wherein the first height of the first cell in the layout exceeds the second height of the second cell in the layout.

18. The method of claim 14, wherein an operating speed of the first cell is greater than an operating speed of the second cell.

19. The method of claim 14, wherein the distance is across five of the plurality of gate electrodes.

20. The method of claim 14, wherein the plurality of first tracks in the first cell has a number identical to that of the plurality of second tracks in the second cell.

* * * * *